Dec. 20, 1932.  G. N. SMITH  1,891,582
MILKING MACHINE
Filed March 27, 1931  4 Sheets-Sheet 1
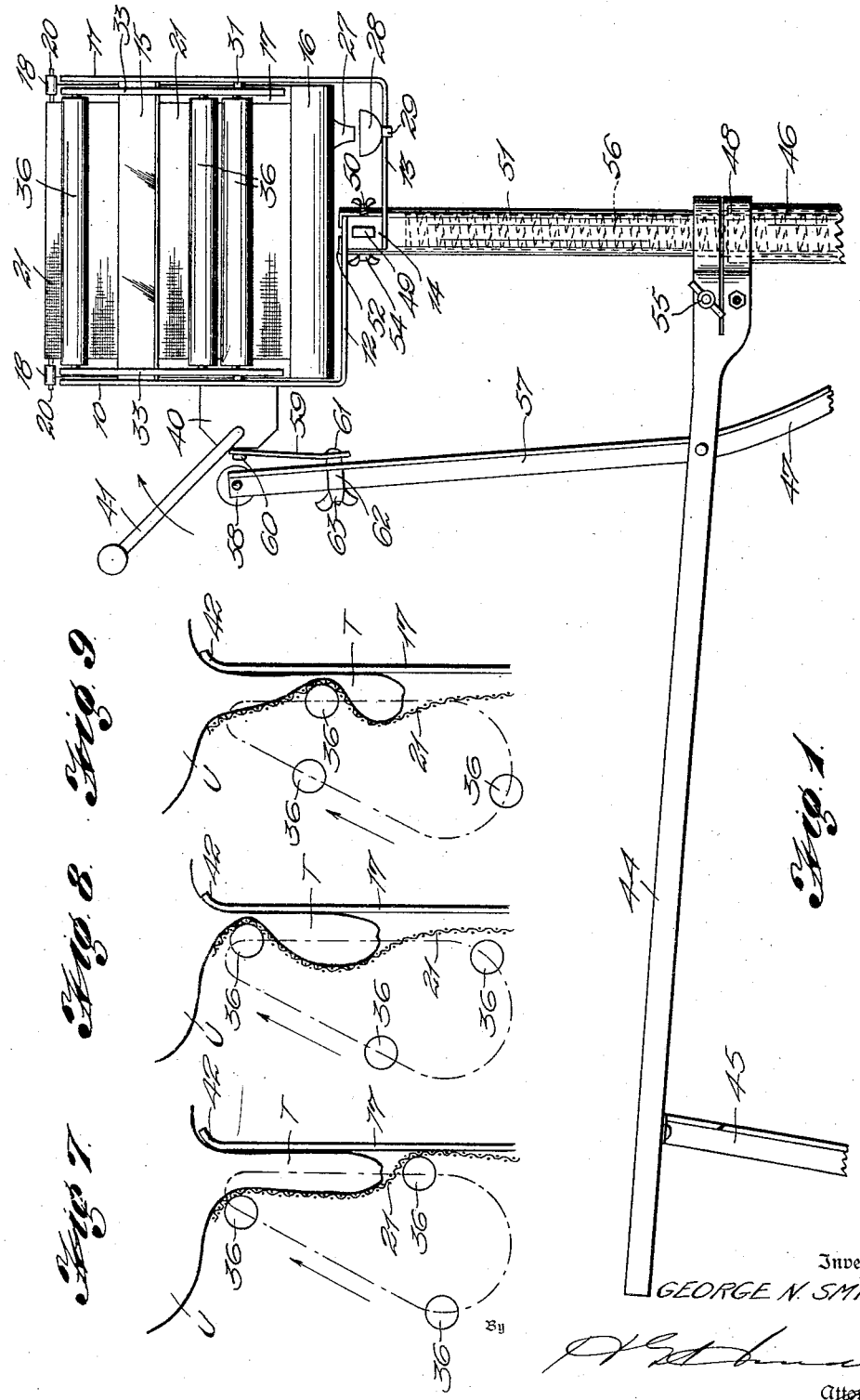
Inventor
GEORGE N. SMITH Dec. 20, 1932. G. N. SMITH 1,891,582
MILKING MACHINE
Filed March 27, 1931 4 Sheets-Sheet 2
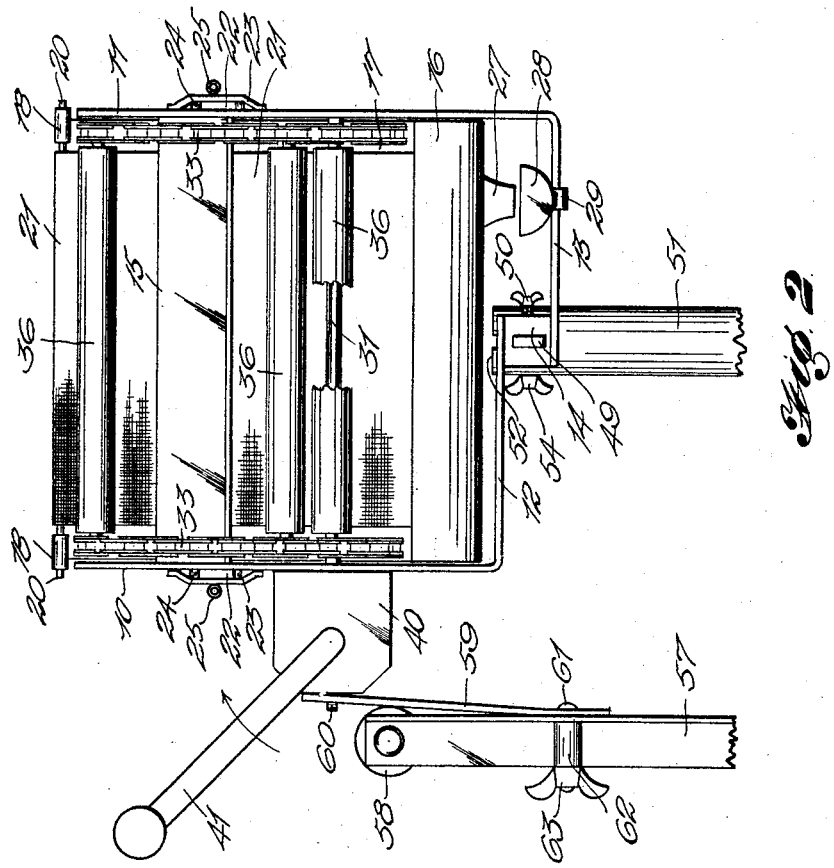
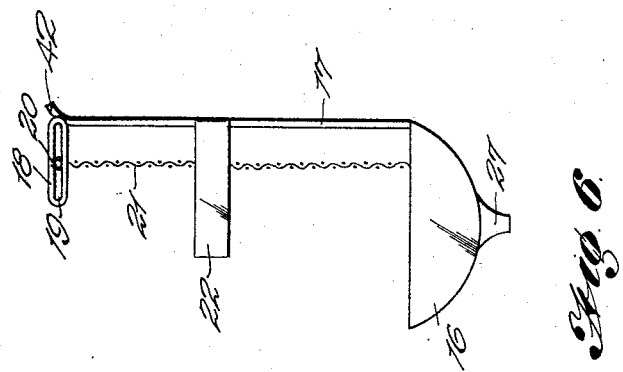
Inventor
GEORGE N. SMITH
By
Attorney

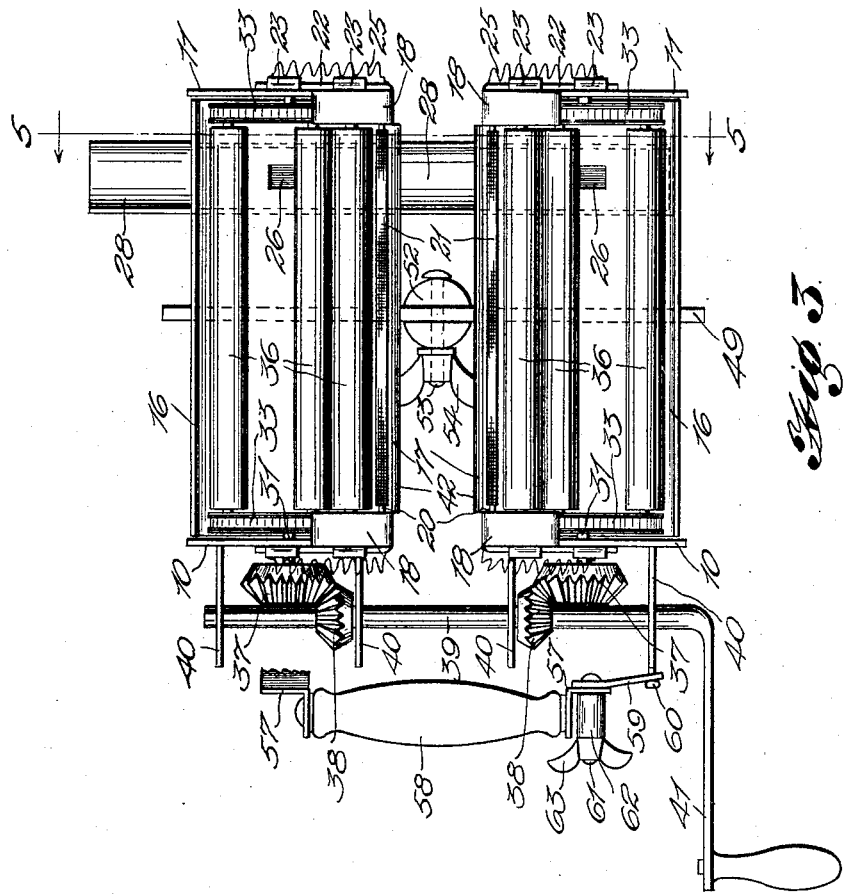

Dec. 20, 1932.  G. N. SMITH  1,891,582
MILKING MACHINE
Filed March 27, 1931    4 Sheets-Sheet 4
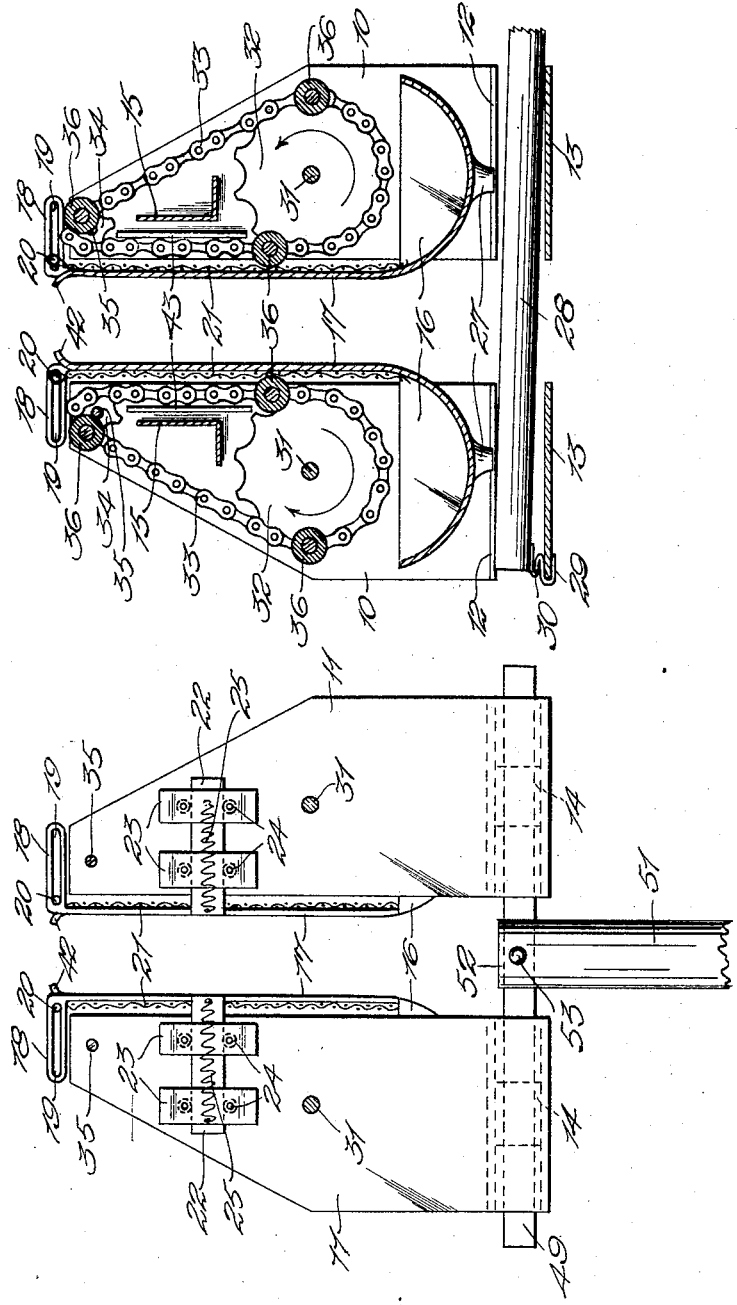
Inventor
GEORGE N. SMITH
By
Attorney Patented Dec. 20, 1932

1,891,582

UNITED STATES PATENT OFFICE

GEORGE N. SMITH, OF HAMILTON, ONTARIO, CANADA, ASSIGNOR OF ONE-HALF TO ARMAND M. SMITH, OF UNION, ONTARIO, CANADA

MILKING MACHINE

Application filed March 27, 1931. Serial No. 525,639.

This invention relates to mechanical milking machines, and consists of a device wherein spaced milking bars carried by an endless conveyor successively squeeze and work the teats against a complemental object.

One important object of the invention is to provide a portable milking machine.

Another important object is to provide such a milking machine which is non-injurious to the teats.

Another important object is to provide a milking machine with certain adjustable features.

Another important object is to provide a device of the class specified which will be simple, durable, efficient, and inexpensive to manufacture.

With the above and other objects in view, as will be presently understood, the invention consists in general of certain novel features of construction and combinations of parts hereinafter fully described, illustrated in the accompanying drawings and specifically claimed.

In the accompanying drawings like characters of reference indicate like parts in the several views, and:

Figure 1 is a side elevation of the entire machine excepting its base which is not important and hence need not be shown.

Figure 2 is an enlarged detailed side elevation of that portion of the machine which is hereinafter referred to as the milking device, and adjacent parts.

Figure 3 is a top view of the milking device and driving mechanism.

Figure 4 is an end view of the milking device.

Figure 5 is a sectional end view of the milking device taken on the line 5—5 of Figure 3.

Figure 6 is a detailed end view of the back plate and milk receiving trough.

Figures 7, 8 and 9 are diagrammatic views showing the cow's teats in three successive stages of the milking process.

In the present embodiment of the invention, the milking device, consisting of two identical units arranged back to back and which shall be termed the twin units, is carried on a combined stand and stool which shall, for reference, be called the milking stool.

The milking device is arranged for elevational adjustability in order to accommodate itself to the various heights from the ground of the udders of different cows. The twin units each receive one pair of teats to be milked and are adjustable to height, independently of the main adjustment, so that one may be raised while the other is correspondingly lowered should the pairs of teats, as frequently happens, be at variance in elevation.

Furthermore, the twin units are adjustable as to their distance apart in order to meet the various spaces between the pairs of teats of different cows.

In use, the milking stool is disposed at one side of the cow in such a position as to bring the milking device directly beneath the udder, which is done by maneuvering the stool, and the operator assumes thereon a position substantially the same as would be taken on a stool when milking by hand.

The twin units, as previously stated, are identical, and thus they shall be described in detail as one. Its frame consists of end plates 10 and 11 having inturned bottom portions 12 and 13, respectively, one of which is disposed lower than the other. The end portions of these bottom plates 12 and 13 overlap with a block 14 interposed between them, and to which they are suitably secured. Toward their upper ends the end plates 10 and 11 are united and made firm by the spacer bar 15. Thus the frame is formed.

Extending across the interval between the end plates, but spaced from the same, is a milk receiving trough 16, and formed as one with this trough, and extending upwardly to a point above the upper extremity of the end plates, is a back plate 17. On the upper portion of the back plate at its ends are formed brackets 18 which over reach the end plates and which are horizontally slotted as at 19 to receive a rod 20. Suspended from, and entirely supported by the rod 20, is a fabric cushion 21, shown in this case in single ply, which extends well down at least to the bottom of the back plate. The rod 20 is movable in the slots 19, and thus the cushion 21 is free to be moved forwardly or rearwardly.

At an intermediate position on each end of the back plate 17, and extending forwardly therefrom are the arms 22. These arms are sleeved in keepers 23 on the outer sides of the end plates, and in which are rollers 24 for reducing friction during the sliding of said arms. Springs 25 are attached at one end to the back plate 17 and at the other end to frame fixtures such as, as in this case, one of the keepers 23 on each side of the frame.

Thus it will be observed that the back plate 17 is free to move forwardly or rearwardly, as supported entirely by the arms 22, but is spring urged forwardly.

The trough 16 is provided with a discharge opening 26 about which is a suitable spout 27.

Beneath the spout is a detachable carrying off trough 28 extending crosswise of the device from one twin unit to the other and arranged to discharge the milk into a pail, in this case at the operator's left hand side. The end opposite the discharge end of the trough 28 is closed and provided with a hook 29 which engages the inturned bottom portion 13, and which may be curved inwardly and then outwardly as shown in Figure 5 (but not in the other figures), before the hook loop is formed so as to provide a rest to elevate that end of the trough, as at 30, thus urging the gravity flow.

On a shaft 31, journaled in the end plates 10 and 11, are driven sprockets 32, and trained on these sprockets are sprocket chains 33 which are also trained on idler sprockets 34 loose on stub shafts 35 on said end plates. Carried on the sprocket chains 33 in equally spaced relation is a plurality of what shall be termed milking bars 36. These bars extend horizontally from one sprocket chain to the other, and preferably in the form of pliable rubber jacketed rollers journaled in said chains.

The sprockets 32 are driven by crown gears 37 fast on the protruding ends of the shafts 31, and which are in turn driven by the pinions 38 with which they are meshed. The pinions 38 are slidably keyed on a shaft 39 (key and keyway not shown) journaled in bearings 40 on the end plates 10 and said shaft is provided with a crank 41 by which it is revolved. This slidability of the pinions 38 on the shaft 39 is to permit the movement of the twin units toward or away from each other, the pinions being jammed between the crown gears and the adjacent bearings 40. It will now be observed that when the shaft 39 is turned to the right, or in the direction indicated by the arrows on the drawings, the milking bars 36 are driven in succession downwardly in a plane parallel with the back plates 17.

In operation one pair of teats T are inserted in each twin unit between the back plate 17 and the fabric cushion 21, the latter being moved forwardly from the position shown in Figures 3, 4 and 5. The upper ends of the back plates 17 are curved outwardly as at 42 so as to provide a rounded surface where the teats converge with the udder U. Now as each single milking bar passes around the upper curve of its path it squeezes the teats between the cushion 21 and the back plate 17 so that the milk canal is closed by the pressure (see Figures 7, 8 and 9), and as the milking bar proceeds downwardly the milk is ejected. By the time one milking bar leaves the bottom of the teats the next bar is ready to engage the teats at the top, and this action is repeated in a continuous motion until the cow is milked dry. The cushions 21 are for the purpose of preventing possible injury to the teats by the milking bars, and the back plates 17 are yieldable through the medium of the springs 25, but these springs urge said plates firmly against the teats. Guides 43 are provided on the inside of the end plates 10 and 11, (see Figure 5) and along which the sprocket chains travel so that the milking bars are not permitted to yield away from the teats.

The milking stool comprises a seat 44 supported by legs 45, a bored perpendicular cylinder 46, and struts 47, the latter being bolted first to the seat and united at the bottom to the cylinder (not shown). The cylinder 46 is permanently clamped in the lower portion of a vertically split and horizontally divided hub or clamp 48 on the end of the seat structure.

The milking device is mounted on a tilting bar 49 which is sleeved through the blocks 14 on the twin units. Thus the twin units are slidable on this bar toward or away from each other as and for the purpose previously specified, and for the purpose of setting the position of the twin units winged set screws 50 are threaded through said blocks to bear against the bar.

Intermediately of the twin units, the tilting bar 49 is pivotally connected to a bored plunger 51, preferably occupying the yoke 52 thereon, and the pivot being formed by the bolt 53 provided with the winged nut 54 by which the degree of tilt of the bar 49 may be set.

The plunger 51 has telescoping connection with the cylinder 46, and is sleeved through the upper portion of the hub 48 in which it may be clamped, and set to a predetermined height by the bolt and winged nut 55.

For ease in making this latter adjustment it is preferable that the milking device be normally urged upwardly to offset the force of gravity, and for this purpose a helical expansion spring 56 is inserted in the bore of both the plunger and the cylinder.

The struts 47, which are in the form of angle iron, are extended upwardly in two furcations 57, between which at the top is a handle 58 located approximately at the balance center of the machine, considering the weight of the seat 44 and legs 45, and by which the machine may be transported from place to place.

A strap or link 59 is loosely pivoted at one end on a lug 60 on one of the bearings 40, and is provided at its opposite end with a stud bolt 61 slidable up and down in a slot (not shown) in one of the furcations 57 when the milking device is raised and lowered as previously described. The stud bolt is provided with a collar 62 and a winged nut 63, the latter being for tightening and setting the link 59 in relation to the furcation, thus steadying the milking device during the milking operation.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new is:

1. In a milking machine, a frame consisting of end plates and means for spacing said plates, an endless milking bar conveyor having a fixed path in the frame and a plurality of milking bars spaced on said conveyor, part of the path of said conveyor being straight, a resiliently yieldable back plate in constant parallel relation with a straight path of said conveyor and adapted to receive teats lengthwise to be worked by said plurality of bars thereagainst, arms rigid on the back plate extending forwardly and slidable in conforming sleeves on the end plates, and means urging the back plate toward said straight path of said conveyor.

2. In a milking machine, a frame consisting of end plates and means for spacing said plates, an endless milking bar conveyor having a fixed path in the frame and a plurality of milking bars spaced on said conveyor, part of the path of said conveyor being straight, sleeves on said end plates defining a straight determined path, slide devices slidable in said sleeves adapted to unalterably follow said determined path, a pack plate rigidly secured to said slide devices disposed parallel with a straight path of said conveyor and adapted to receive teats lengthwise to be worked by said plurality of bars thereagainst, and springs connecting the back plate and a stationary part of the frame urging the back plate toward said straight path of said conveyor.

In testimony whereof he has affixed his signature.

GEORGE N. SMITH.